(12) United States Patent
Barkan et al.

(10) Patent No.: US 12,217,128 B2
(45) Date of Patent: *Feb. 4, 2025

(54) MULTIPLE FIELD OF VIEW (FOV) VISION SYSTEM

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/088,771

(22) Filed: Dec. 26, 2022

(65) Prior Publication Data
US 2024/0211712 A1 Jun. 27, 2024

Related U.S. Application Data

(63) Continuation of application No. 16/827,000, filed on Mar. 23, 2020, now Pat. No. 11,538,262.

(51) Int. Cl.
*G06K 7/10* (2006.01)
*G06K 7/14* (2006.01)
(Continued)

(52) U.S. Cl.
CPC .............. *G06K 7/1447* (2013.01); *G06T 7/70* (2017.01); *G06V 10/44* (2022.01); *G06V 10/761* (2022.01);
(Continued)

(58) Field of Classification Search
CPC .... G06Q 20/20; G06Q 20/3276; G06Q 30/06; G06Q 20/3274; G06Q 30/0268;
(Continued)

(56) References Cited

U.S. PATENT DOCUMENTS 9,892,301 B1 * 2/2018 Holub ................. G06F 18/2415
9,892,438 B1 * 2/2018 Kundu ............... G06Q 30/0609
(Continued)

*Primary Examiner* — Daniel St Cyr
(74) *Attorney, Agent, or Firm* — Yuri Astvatsaturov

(57) ABSTRACT

Multiple field of view (FOV) systems are disclosed herein. An example system includes a bioptic barcode reader having a target imaging region. The bioptic barcode reader includes at least one imager having a first FOV and a second FOV and is configured to capture an image of a target object from each FOV. The example system includes one or more processors configured to receive the images and a trained object recognition model stored in memory communicatively coupled to the one or more processors. The memory includes instructions that, when executed, cause the one or more processors to analyze the images to identify at least a portion of a barcode and one or more features associated with the target object. The instructions further cause the one or more processors to determine a target object identification probability and to determine whether a predicted product identifies the target object.

16 Claims, 5 Drawing Sheets

(51) Int. Cl.
*G06T 7/70* (2017.01)
*G06V 10/44* (2022.01)
*G06V 10/74* (2022.01)

(52) U.S. Cl.
CPC ............... *G06T 2207/10024* (2013.01); *G06T 2207/20081* (2013.01)

(58) Field of Classification Search
CPC ............ G06K 7/10722; G06K 7/1413; G06K 7/1417; G06K 19/06037; G06K 19/06028; G06K 7/1443; G06K 7/1447; G06T 7/70; G06T 7/00; G06V 10/44; G06V 10/761; G06V 10/17
USPC .................................... 235/462.01, 383, 385
See application file for complete search history.

(56) References Cited

U.S. PATENT DOCUMENTS

| | | | |
|---|---|---|---|
| 11,842,487 B2 * | 12/2023 | Jie | G06T 7/11 |
| 2008/0231228 A1 * | 9/2008 | Fowler | G06Q 30/02 |
| | | | 320/107 |
| 2013/0278425 A1 * | 10/2013 | Cunningham | G08B 13/246 |
| | | | 340/572.1 |
| 2014/0351098 A1 * | 11/2014 | Shafer | G06Q 10/087 |
| | | | 705/28 |
| 2016/0210492 A1 * | 7/2016 | Trajkovic | A61N 1/37205 |
| 2020/0273013 A1 * | 8/2020 | Garner | G06Q 20/42 |

* cited by examiner

MULTIPLE FIELD OF VIEW (FOV) VISION SYSTEM

CROSS-REFERENCE TO RELATED APPLICATION

This application is a continuation of U.S. patent application Ser. No. 16/827,000, filed on Mar. 23, 2020, and incorporated herein by reference in its entirety.

BACKGROUND

Theft events of products or target objects are common at retail venue locations, and especially common at high-traffic, or routinely visited locations. Theft can occur in various ways, including at or near a point-of-sale (POS) terminals or target objects scanners, by a thief performing one or more of ticket switching (e.g., scanning the barcode a low priced target object instead of a high priced target object with), scan avoidance, and/or "sweethearting" (e.g., employee related theft involving an employee providing customers with unauthorized discounts or free merchandise or services).

Typical practices of deterring or otherwise preventing shrink events apply a holistic or universal approach, where a retail venue location, or other such establishment, will set up security measurements (e.g., a security guard who checks products against receipts) that typically apply equally to all products. Thus, such typical security measures may be limited, or ineffective, especially at retail venues with large quantities of products or target objects leaving the store at any given time, where it may be difficult for a holistic approach to accurately monitor all target objects in the venue location at once. For example, such retail venues may have a difficult time monitoring target objects, presumably scanned or imaged at a POS terminal, especially in more modern stores where customers typically scan, image, or otherwise implement check out processes themselves via, e.g., a "self-check" POS or kiosk.

More recently, conventional techniques also include security measures implemented within POS stations themselves. These conventional techniques may utilize POS terminal imaging systems to perform machine vision or other artificial intelligence measures to detect theft events. However, such conventional techniques are limited because they rely on a single field of view (FOV). For example, a thief may ticket switch by covering one side of a high priced object facing the POS terminal with a lower priced object to trick the POS terminal and get a lower price for the high priced object. This scenario is difficult to detect using conventional techniques that utilize a single FOV.

Accordingly, in order to reduce theft events, there is a need for multiple FOV systems and methods for implementing artificial intelligence based object prediction/recognition.

SUMMARY

The multiple FOV systems and methods herein implement artificial intelligence based object prediction/recognition to detect and prevent target object theft, such as ticket switching, scan avoidance, and sweethearting. In some embodiments, the disclosed systems and methods implement object recognition, via trained objection recognition models, to assist in recognition of the target object for sale and identification in cases where a barcode cannot be scanned successfully. In various embodiments, use of neural network based object recognition in camera/imaging is used to scan and/or image target objects to reduce theft events.

Accordingly, in an embodiment, the present invention is a bioptic barcode reader having a target object imaging region. The bioptic barcode reader includes at least one imager having a first field of view (FOV) and a second FOV, wherein the at least one imager is configured to capture (i) a first image of a target object placed in the target imaging region within the first FOV and (ii) a second image of the target object within the second FOV. The bioptic barcode reader further includes one or more processors configured to receive the first image and the second image captured by the at least one imager. The bioptic barcode reader further includes a trained object recognition model stored in a memory communicatively coupled to the one or more processors, wherein the memory stores instructions that, when executed by the one or more processors, cause the one or more processors to: analyze the first image and the second image to identify at least a portion of a barcode associated with the target object in either the first image or the second image; analyze the first image and the second image to identify one or more features associated with the target object in each of the first image and the second image; determine, with the trained object recognition model, a target object identification probability for the target object based on (i) a set of barcode data extracted from the at least the portion of the barcode and (ii) the one or more features, wherein the target object identification probability associates the target object with a predicted product; and compare the target object identification probability to an identification probability threshold to determine whether the predicted product identifies the target object.

In a variation of this embodiment, responsive to determining that the target object identification probability exceeds the identification probability threshold, the instructions further cause the one or more processors to compare the at least the portion of the barcode to a predicted barcode associated with the predicted product. In this variation, responsive to determining a match between the at least the portion of the barcode and the predicted barcode the instructions further cause the one or more processors to at least one of (i) identify the target object as the predicted product and (ii) train the trained object recognition model using the at least the portion of the barcode and the predicted product.

In another variation of this embodiment, the instructions further cause the one or more processors to generate, with the trained object recognition model, a first set of target object identification probabilities based on the first image, wherein the first set of target object identification probabilities includes a first probability associating the target object with the predicted product. In this variation, the instructions further cause the one or more processors to generate, with the trained object recognition model, a second set of target object identification probabilities based on the second image, wherein the second set of target object identification probabilities includes a second probability associating the target object with the predicted product; and determine whether the predicted product identifies the target object by comparing the first probability and the second probability to the identification probability threshold.

In yet another variation of this embodiment, the instructions cause the one or more processors to generate, with the trained object recognition model, a set of target object identification probabilities based on the first image and the second image, wherein the set of target object identification probabilities includes a first probability associating the target object with the predicted product; and determine whether the predicted product identifies the target object by comparing the first probability to the identification probability threshold.

In another embodiment, the present invention is a target object recognition method for a bioptic barcode reader having a target object imaging region. The target object recognition method includes capturing, with at least one imager of the bioptic barcode reader, a first image of a target object placed in the target imaging region from a first FOV and a second image of the target object from a second FOV. The target object recognition method further includes analyzing the first image and second image to identify at least a portion of a barcode associated with the target object in either the first image or the second image. The target object recognition method further includes analyzing the first image and second image to identify one or more features associated with the target object in each of the first image and the second image. The target object recognition method further includes determining, with a trained object recognition model, a target object identification probability for the target object based on (i) a set of barcode data extracted from the at least the portion of the barcode and (ii) the one or more features, wherein the target object identification probability associates the target object with a predicted product. The target object recognition method further includes comparing the target object identification probability to an identification probability threshold to determine whether the predicted product identifies the target object.

In a variation of this embodiment, the target object recognition method further includes, responsive to determining that the target object identification probability exceeds the identification probability threshold, comparing the at least the portion of the barcode to a predicted barcode associated with the predicted product. In this variation, the target object recognition method further includes responsive to determining a match between the at least the portion of the barcode and the predicted barcode, at least one of (i) identifying the target object as the predicted product and (ii) training the trained object recognition model using the at least the portion of the barcode and the predicted product.

In another variation of this embodiment, the target object recognition method further includes generating, with the trained object recognition model, a first set of target object identification probabilities based on the first image, wherein the first set of target object identification probabilities includes a first probability associating the target object with the predicted product. In this variation, the target object recognition method further includes generating, with the trained object recognition model, a second set of target object identification probabilities based on the second image, wherein the second set of target object identification probabilities includes a second probability associating the target object with the predicted product. In this variation, the target object recognition method further includes determining whether the predicted product identifies the target object by comparing the first probability and the second probability to the identification probability threshold.

In yet another variation of this embodiment, the target object recognition method further includes generating, with the trained object recognition model, a set of target object identification probabilities based on the first image and the second image, wherein the set of target object identification probabilities includes a first probability associating the target object with the predicted product. In this variation, the target object recognition method further includes determining whether the predicted product identifies the target object by comparing the first probability to the identification probability threshold.

In another embodiment, the present invention is a bioptic barcode reader having a target object imaging region. The bioptic barcode reader includes at least one imager having a first field of view (FOV) and a second FOV, wherein the at least one imager is configured to capture (i) a first image of a target object placed in the target imaging region within the first FOV and (ii) a second image of the target object within the second FOV. The bioptic barcode reader further includes one or more processors configured to receive the first image and the second image captured by the at least one imager, and a trained object recognition model stored in a memory communicatively coupled to the one or more processors. The memory stores instructions that, when executed by the one or more processors, cause the one or more processors to analyze the first image and second image to identify one or more features associated with the target object in each of the first image and the second image; generate, with the trained object recognition model, a set of target object identification probabilities based on the one or more features, wherein the set of target object identification probabilities includes a primary probability associating the target object with a predicted product; and determine whether the predicted product identifies the target object by comparing the primary probability to an identification probability threshold.

In a variation of this embodiment, the instructions cause the one or more processors to generate, with the trained object recognition model, a first set of target object identification probabilities based on the first image, wherein the first set of target object identification probabilities includes a first probability associating the target object with a first predicted product. In this variation, the instructions further cause the one or more processors to generate, with the trained object recognition model, a second set of target object identification probabilities based on the second image, wherein the second set of target object identification probabilities includes a second probability associating the target object with the first predicted product. In this variation, the instructions further cause the one or more processors to determine whether the first predicted product identifies the target object by comparing the first probability and the second probability to the identification probability threshold.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
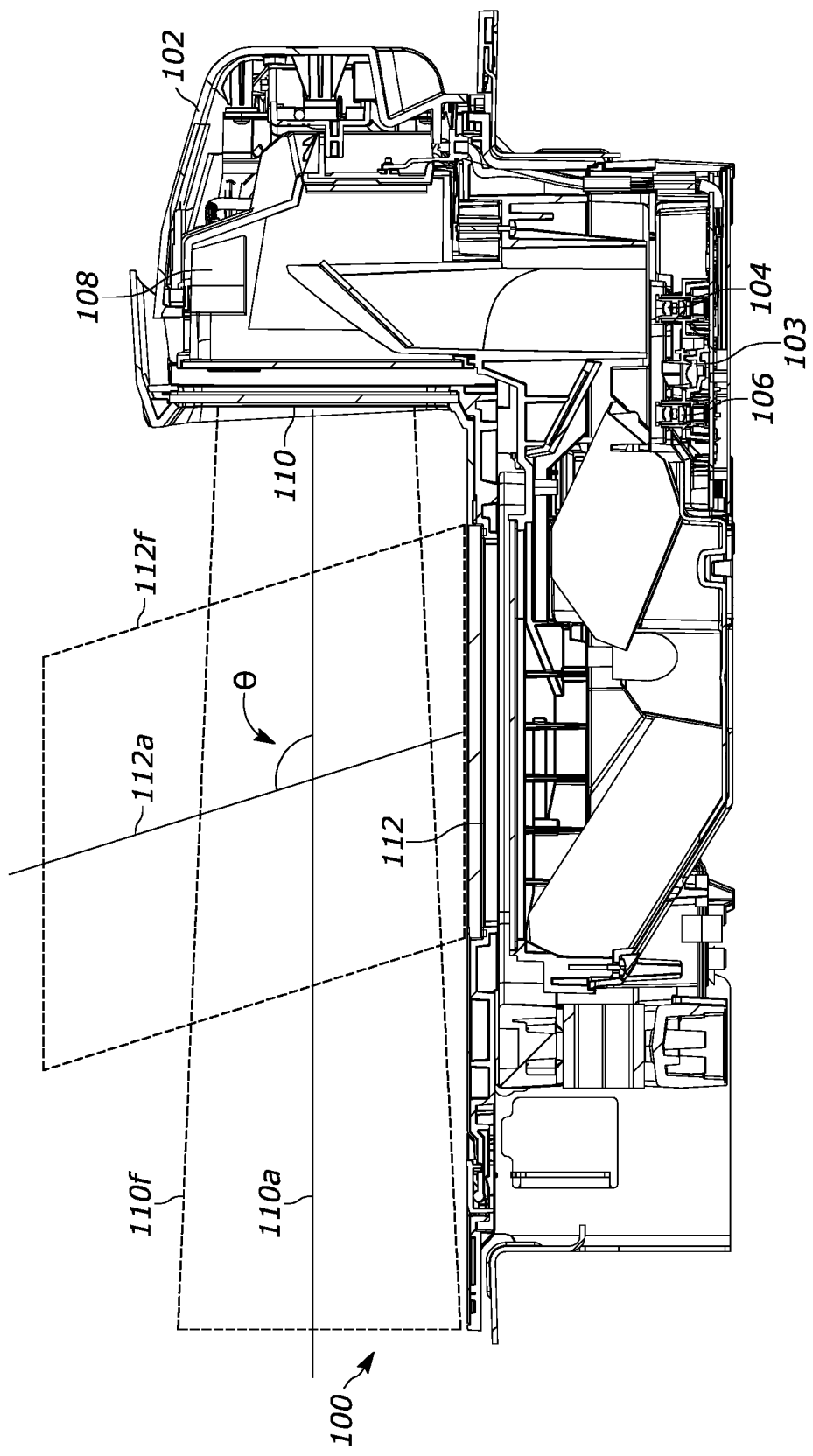
FIG. 1A illustrates a cross section view of an example bioptic barcode reader in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1A illustrates a cross section view of an example bioptic barcode reader 100 in accordance with various embodiments disclosed herein. In particular, bioptic barcode reader 100 includes a housing 102 and a primary imager assembly 103 including one or more primary imagers, represented collectively as elements 104 and 106. These two primary imagers may be a vertical imager 104 and a horizontal imager 106. Primary imager assembly 103 may include two cameras for the purpose of imaging or capturing image data of target objects passing through a scanning area of the bioptic barcode reader 100. Such image data may comprise 1-dimensional (1D) and/or 2-dimensional (2D) images of objects or target objects, including, for example, packages, products, or other target objects that may or may not include barcodes, QR codes, or other such labels for identifying such packages, products, or other target objects, which may be, in some examples, merchandise available at retail/wholesale store, facility, or the like. A processor (e.g., processor 302) of bioptic barcode reader 100 (e.g., processor 302 and/or trained object recognition model 310) may analyze the image data of target objects passing through a scanning area or scan volume of bioptic barcode reader 100.

In embodiments, processor 302 and/or trained object recognition model 310 may determine, by taking the image data as input, target object identification for the target object. Additionally, or alternatively, the processor 302 and/or trained object recognition model 310, via primary imager assembly 103, may identify a barcode with the image data and/or decode product information from the barcode.

In certain embodiments, the primary imager assembly 103 is a bioptic camera positioned at a surface of a point of sale (POS) station and/or kiosk. Additionally, the vertical imager 104 may be a color camera, monochromatic camera, RFID sensor, or any other suitable imaging device. In certain embodiments, the horizontal imager 106 may be a color camera, monochromatic camera, RFID sensor, or any other suitable imaging device. The bioptic barcode reader 100 may further include a primary illumination assembly 108. The primary illumination assembly 108 is positioned within the housing 102, and is configured to emit a primary illumination during a scanning session (e.g., a customer or store clerk passing an target object across the bioptic barcode reader 100 scanning area).

The primary imager assembly 103 may activate to capture the first image(s)/image data during a scanning session. Generally, the primary illumination assembly 108 may emit the primary illumination through a substantially vertical imaging window 110 and/or a substantially horizontal imaging window 112 of the bioptic barcode reader 100 to illuminate the target object prior capturing the first image of with the primary imager assembly 103. The primary illumination assembly 108 may begin emitting the primary illumination before the scanning session, and may continue emitting the primary illumination until the end, before the end, or after the end of the scanning session. In embodiments, the primary illumination assembly 108 may begin emitting the primary illumination after the beginning of the scanning session, and may stop emitting the primary illumination before the end, until the end, or after the end of the scanning session. Additionally, or alternatively, the primary illumination assembly 108 may emit the primary illumination at intervals (e.g., illumination pulses) before, during, and/or after the scanning session.

The primary illumination has a primary illumination wavelength range. In certain embodiments, the primary illumination is monochromatic illumination, and the primary illumination wavelength range is in the near-infrared spectrum or any other suitable wavelength range to scan 1D or 2D images, including white light.

The substantially vertical imaging window 110 defines a first field of view (FOV) 110$f$ of bioptic barcode reader 100 with a first central axis 110$a$. In addition, the substantially horizontal imaging window 112 defines a second FOV 112$f$ of bioptic barcode reader 100 with a second central axis 112$a$. Each of the field of views 110$f$ and 112$f$ are optical fields of views, and either alone or together, may define a scanning area of bioptic barcode reader 100. Together, optical field of views 110$f$ and 112$f$ allow bioptic barcode reader 100 to scan multiple sides of a given package, target object, or otherwise target object passing through the scanning area.

In embodiments, the first central axis 110$a$ is substantially orthogonal to the second central axis 112$a$, and as a result, the angle formed by the intersection of both axes θ is equal to or approximately equal to 90°. Generally speaking, the first central axis 110$a$ may be substantially orthogonal to the second central axis 112$a$ if the angle formed by the intersection of both axes θ is within 20° of a right angle (e.g., 70°≤θ≤110°). This orthogonality allows the primary imager assembly 103 to potentially view multiple sides of a product during a single scanning session to achieve greater reliability when identifying the product. However, it will be appreciated that the first central axis 110$a$ and the second central axis 112$a$ may be substantially orthogonal if the angle formed by the intersection of both axes 110$a$, 112$a$ is any angle suitable to view multiple sides of a product through the first and second FsoV 110$f$, 112$f$.

It is to be understood that the primary imager assembly 103 may be configured to capture the first image(s) of a target object through both FsOV (110$f$, 112$f$). The primary imager assembly 103 may utilize the vertical imager 104 to capture images of the target object through the substantially vertical imaging window 110 and the first FOV 110$f$, and may utilize the horizontal imager 106 to capture images of the target object through the substantially horizontal imaging window 112 and the second FOV 112$f$. As a result, the primary imager assembly 103 may be configured to capture both a first image and a second image of the target object because the primary imager assembly 103 is configured to capture images of the target object through both the first FOV 110$f$ and the second FOV 112$f$. Moreover, in embodiments, the primary imager assembly 103 may include a single imager (not shown) that is configured to capture both the first image(s) through the first FOV 110f and the second image(s) through the second FOV 112f.

The bioptic barcode reader 100 may be configured to automatically activate upon an object's or target object's entry into the scanning area defined by at least one of field of views 110f and/or 112f. In certain embodiments, once an object enters the scanning area, primary illumination assembly 108 may activate to emit the primary illumination through the substantially vertical imaging window 110. Primary imager assembly 103 may then activate to capture a first image(s)/image data of the object. It is to be understood however, that activation of bioptic barcode reader 100 need not be automatic upon an object entering the optical FOV. Activation of bioptic barcode reader 100 may occur through any suitable means, including manual activation. Accordingly, activation of bioptic barcode reader 100, e.g., via an object entering the optical FOV, may cause bioptic barcode reader 100 to capture image data. Such image data may include, for example, product codes (e.g., barcodes or QR codes) associated with corresponding products as well as visual images of the product being scanned or imaged, as further described herein.

Figure 1B:
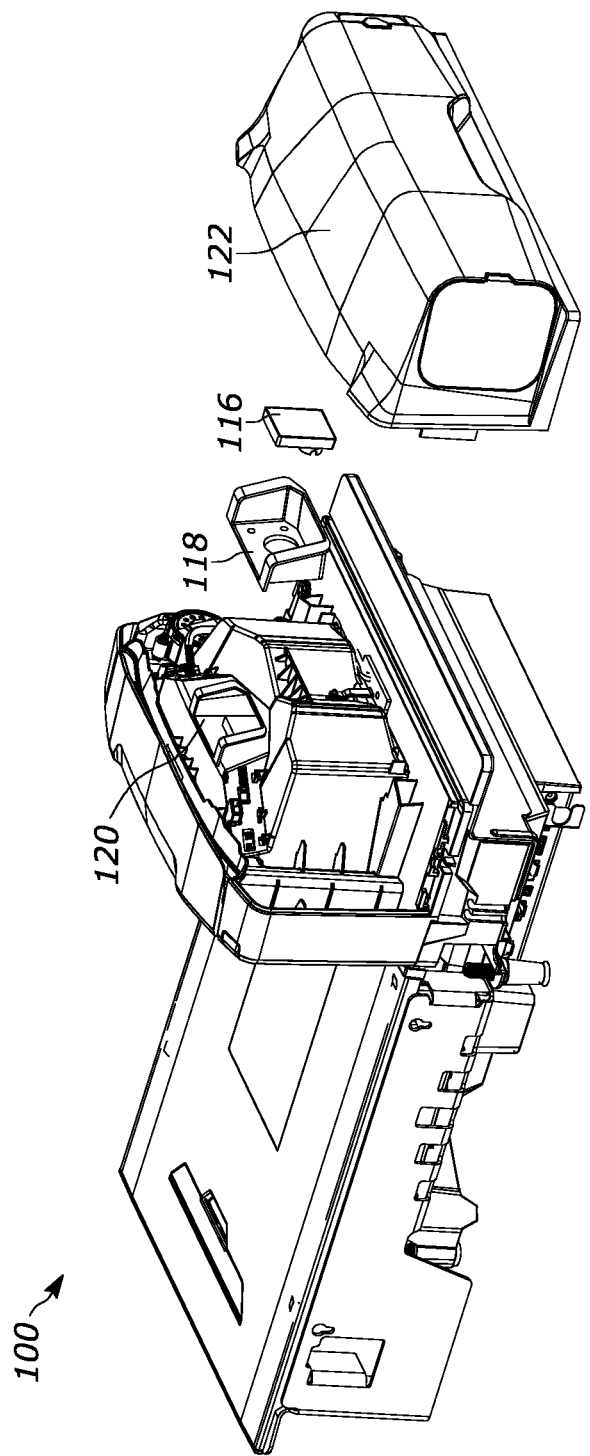
FIG. 1B illustrates an exploded view of the example bioptic barcode reader of FIG. 1A that further includes a secondary imager assembly, in accordance with embodiments disclosed herein.

In embodiments, the bioptic barcode reader 100 of FIG. 1A may include a secondary imaging assembly configured to capture a second image(s)/set(s) of image data of a target object passing through the scanning area of bioptic barcode reader 100. For example, FIG. 1B illustrates an exploded view of the example bioptic barcode reader 100 of FIG. 1A, in accordance with these embodiments. In the embodiment of FIG. 1B, the bioptic barcode reader 100 includes a secondary imager assembly 116 including one or more secondary imagers (not shown). The one or more secondary imagers of secondary imager assembly 116 are configured to capture one or more second images/sets of image data of an object or target object passing through the scanning area of bioptic barcode reader 100. In certain embodiments, secondary imager assembly 116 is a color camera positioned at an area above the surface of the POS station. In other embodiments, secondary imager assembly 116 may be positioned externally from the housing (e.g., housing 102).

In certain embodiments, the one or more secondary imagers of secondary imager assembly 116 are configured to capture a second image of the target object. Generally, the primary imager assembly 103 and the secondary imager assembly 116 may be positioned to capture images from different FsOV to maximize image data available for a target object. For example, the one or more primary imagers may be configured to capture the first image(s) through the either of the first FOV 110f or the second FOV 112f, and the one or more secondary imagers may be configured to capture the second image through the other of the first FOV 110f and the second FOV 112f. Moreover, the one or more secondary imagers may activate to capture the second image(s) of the target object before, after, or simultaneously with the one or more primary imagers.

To illustrate, if a user wishes to purchase a target object, the user may pass the target object, including any barcode(s) affixed to or otherwise associated with the target object, through FOV 110f and/or FOV 112f of bioptic barcode reader 100. Once the target object is passed through FOV 110f and/or FOV 112f, the primary imager assembly 103 may activate to capture the first image(s) of the target object and/or one or more barcodes associated with the target object. Additionally or alternatively, the secondary imager assembly 116 may activate to capture the second image(s) of the target object.

The data, images, or otherwise information captured from either primary imager assembly 103 and/or secondary imager assembly 116 may be transmitted to POS stations, servers, or other processing devices or processors (e.g., remote processor(s) 322) for a variety of purposes including, e.g., product purchases, data storage, inventory purposes, training of artificial intelligence models, etc.

In the embodiment of FIG. 1B, bioptic barcode reader 100 further includes a secondary imager assembly holder 118 and a secondary imager assembly opening 120. The secondary imager assembly holder 118 is designed to couple secondary imager assembly 116 with the secondary imager assembly opening 120. The secondary imager assembly holder 118 and secondary imager assembly opening 120 place secondary imager assembly 116 in a position to capture the second image data of the target object. In certain embodiments, the secondary imager assembly holder 118 may be adjustable between portrait and landscape orientations.

Bioptic barcode reader 100 further includes an adjustable exterior covering 122. The adjustable exterior covering 122 may be a part of the housing 102, and may be detachable from the remainder of bioptic barcode reader 100. For example, in certain embodiments, when portrait orientation images are desired, the adjustable exterior covering 122 may be removed, and the secondary imager assembly holder 118 may be adjusted to facilitate secondary imager assembly 116 capturing the second image data in a portrait orientation.

Figure 1C:
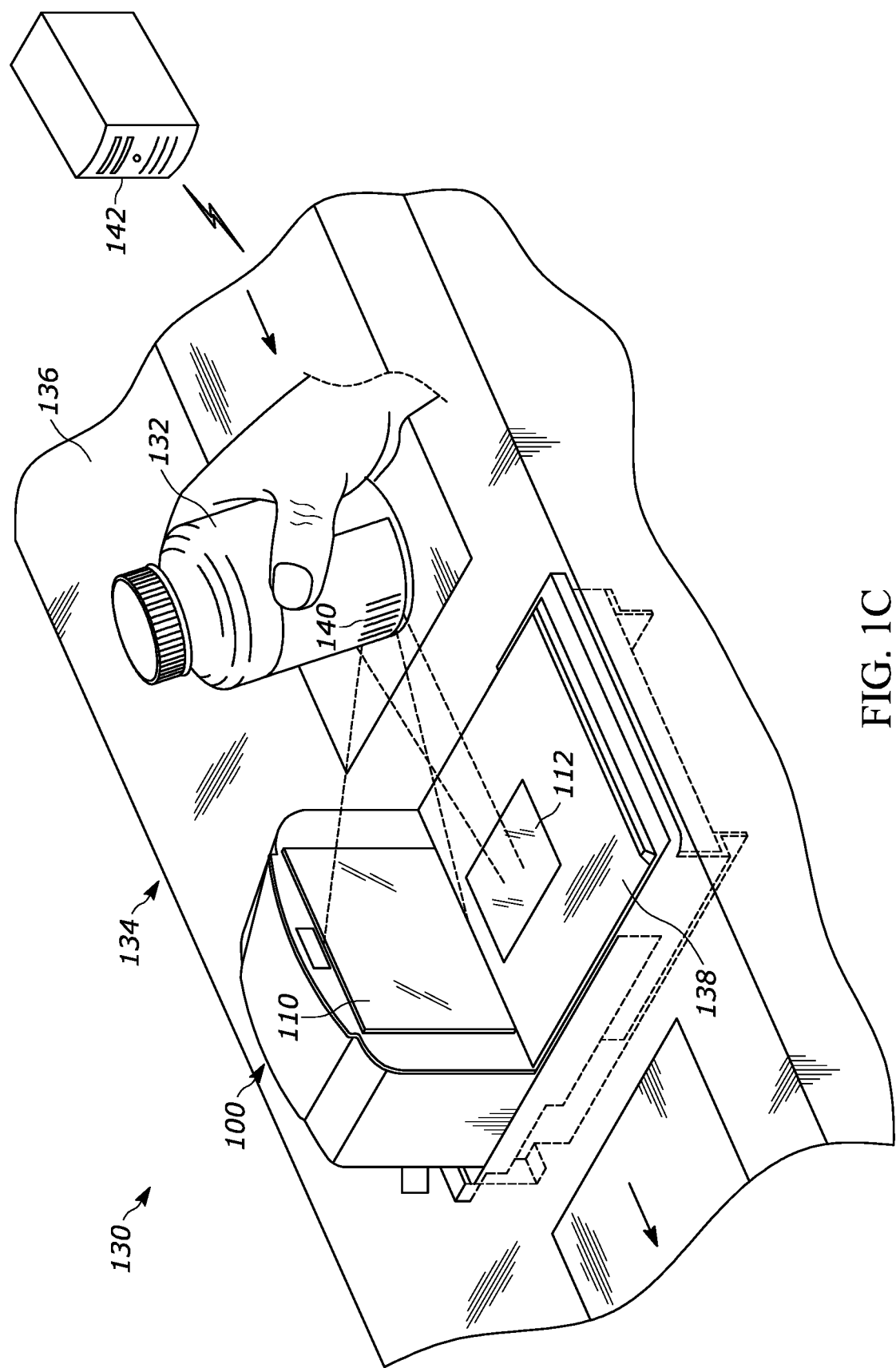
FIG. 1C is a perspective view of the example bioptic barcode reader of FIG. 1A, implemented in an example point-of-sale (POS) system, showing capture of an image of a target object, in accordance with embodiments disclosed herein.

FIG. 1C is a perspective view of the example bioptic barcode reader 100 of FIG. 1A, implemented in an example point-of-sale (POS) system 130, showing capture of an image of a target object 132 being swiped across the bioptic barcode reader 100 scanning area. The POS system 130 includes a workstation 134 with a counter 136, and the bioptic barcode reader 100. The bioptic barcode reader 100 includes a weighing platter 138, which may be a removable or a non-removable. Typically, a customer or store clerk will pass the target object 132 across at least one of the substantially vertical imaging window 110 and the substantially horizontal imaging window 112 to enable the bioptic barcode reader 100 to capture one or more images of the target object 132, including the barcode 140.

However, in certain circumstances, a customer or store clerk may attempt a theft event, such as scan avoidance, ticket switching, or sweethearting. As a typical example of scan avoidance, the customer or store clerk may pass the target object 132 above the substantially vertical imaging window 110 to avoid the first FOV 110f or beyond the length of the weighing platter 138 to avoid the second FOV 112f. In either case, the customer or store clerk may position the barcode 140 away from the FOV capable of imaging the target object 132 to prevent the bioptic barcode reader 100 from identifying the target object 312. For example, if the customer or store clerk pass the target object 132 above the substantially vertical imaging window 110 to avoid the first FOV 110f, the customer or store clerk may position the barcode similarly to the illustration of FIG. 1C (e.g., facing the substantially vertical imaging window 110). In this manner, the customer or store clerk avoids placing the barcode 140 within view of the bioptic barcode reader 100 while maintaining an appearance of scanning the target object 132. In this circumstance, a conventional system may fail to identify the avoided scan of the target object 132 because the conventional system may only use one FOV (e.g., the first FOV 110f) to identify scan avoidance. By contrast, the bioptic barcode reader 100 illustrated in FIG. 1C may readily identify the avoided scan of the target object 132 by capturing an image (e.g., the second image) of the target object 132 as it is passed across the second FOV 112f.

Similarly, if a customer or store clerk attempts to avoid the second FOV 112f, the customer or store clerk may position the barcode facing the second FOV 112f, but pass the target object across the scanning area beyond the length of the weighing platter 138. In this circumstance, a conventional system may fail to identify the avoided scan of the target object 132 because the conventional system may only use one FOV (e.g., the second FOV 112f) to identify scan avoidance. By contrast, the bioptic barcode reader 100 illustrated in FIG. 1C may readily identify the avoided scan of the target object 132 by capturing an image (e.g., the first image) of the target object 132 as it is passed across the first FOV 110f.

As illustrated in FIG. 1C, the bioptic barcode reader 100 may capture images of the target object 132 such as, e.g., a package or a produce target object. As previously mentioned, image capture may be performed by positioning the target object 132 within the fields of view (FOV) (e.g., first FOV 110f and second FOV 112f) of the digital imaging sensor(s) housed inside the bioptic barcode reader 100. The bioptic barcode reader 100 captures images through these windows 110, 112 such that a barcode 140 associated with the target object 132 is digitally read through at least one of the substantially vertical imaging window 110 and the substantially horizontal imaging window 112. In particular, the bioptic barcode reader 10 may be configured to generate a signal indicating a timestamp and/or frame number associated with a successful decoding of the barcode 140.

More specifically, the bioptic barcode reader 100 captures images of the target object 132, which generates image data that can be processed, e.g., using image recognition techniques, to identify the target object 132 with a predicted product and determine whether the predicted product matches the barcode 140. The bioptic barcode reader 100 may analyze the images captured through the first FOV and the second FOV (e.g., the first image(s) and the second image(s)) to identify at least a portion of the barcode 140 and one or more features associated with the target object 132. The bioptic barcode reader 100 may then determine a target object identification probability using the at least the portion of the barcode 140 and the one or more features included in one or both of the first image(s) and the second image(s).

Generally speaking, the one or more features may include any visual characteristic associated with the target object that is unique to the target object 132 or otherwise indicative of the identity of the target object 132. In embodiments, the one or more features includes at least one of (i) a graphic on the target object 132, (ii) an alphanumeric character on the target object 132, (iii) an edge of the target object 132, or (iv) a color of the target object 132. For example, one or more features associated with the target object 132 depicted in FIG. 1C may include a circular bottom of the target object 132, a portion of the label upon which the barcode 140 is printed, and/or a lack or absence of alphanumeric characters on the target object 132 exterior.

The POS system 130 may further include a server 142 communicatively coupled to the bioptic barcode reader 110 through a wired or wireless communication link. In embodiments, the server 142 is a remote server, while in other embodiments, the server 142 is a local server. The server 142 may be communicatively coupled to a plurality of POS systems (similar to POS system 130) positioned at checkout area of a facility, for example. In embodiments, the server 142 is implemented as an inventory management server that generates and compares target object identification probability data. The server 142 may be accessible by a manager for monitoring operation and improper product scanning by the bioptic barcode reader 110.

Figure 2:
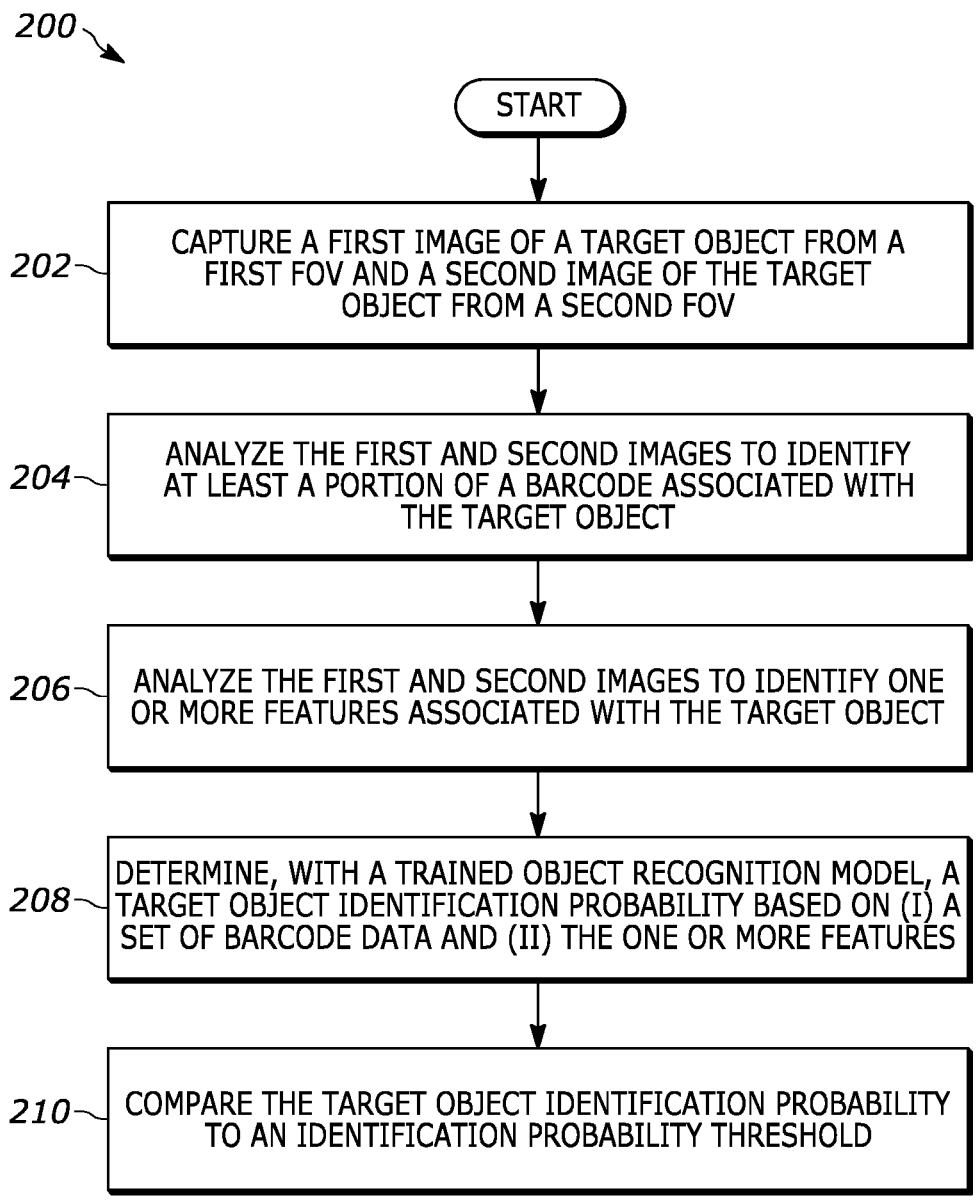
FIG. 2 illustrates an example method for implementing artificial intelligence based object recognition, in accordance with embodiments disclosed herein.

FIG. 2 illustrates an example method 200 for implementing artificial intelligence based target object determination, in accordance with example embodiments herein. The example method 200 may be implemented by a target object recognition scanning system, including, for example, the bioptic barcode reader 100 as described herein for FIGS. 1A, 1B, 1C or, more generally, by processing platform 300, including remote processor(s) 322 and/or remote server 320, as described for FIG. 3. For example, in embodiments, the one or more processors may be processors associated with a scanner housing of the imager (e.g., bioptic barcode reader 100). In other embodiments, the one or more processors may be processors associated with a bioptic device, kiosk, or other device in local proximity to the scanner. In still further embodiments, the one or more processors can be implemented in a server (e.g., server 142), such as a store, building, or facility collocated with the imager or a remote server (e.g., remote server 320) available via the Internet or cloud.

In particular, and in embodiments, the target object recognition scanning system may include one or more processors (e.g., processor 302) co-located with the imager (e.g., bioptic barcode reader 100 or an imager and/or imager assembly thereof) onsite at a physical location (e.g., a retail or wholesale store, POS system 130). Additionally or alternatively, one or more processors (e.g., remote processors 322) may be located at a server (e.g., 142, 320) remote to the imager. In such embodiments, the server may be communicatively coupled to the imager via a computer network through networking interface 306.

The example method 200 begins by capturing, with at least one imager (e.g., primary imager assembly 103) of a bioptic barcode reader having a target object imaging region, a first image of a target object (e.g., target object 132) placed in the target imaging region from a first FOV and a second image of the target object from a second FOV (block 202). Generally, a target object passes through one or both of the optical FsOV (110f, 112f) of the bioptic barcode reader which activates the bioptic barcode reader to capture at least two images of the target object. At least one image is generally captured from a first FOV (e.g., first FOV 110f), and at least one image is generally captured from a second FOV (e.g., second FOV 112f). In embodiments, the at least one imager comprises one imager, and the bioptic barcode reader has no other imagers configured to capture the first image and the second image. Block 202 may be performed by, for example, the bioptic barcode reader 100, and more specifically, the primary imager assembly 103.

In embodiments, the second FOV has a relative orientation with respect to the first FOV. The relative orientation may indicate that the second FOV is offset from the first FOV, and as a result, the second image captured from the second FOV may feature a different perspective of the target object than the first image captured from the first FOV. For example, the relative orientation of the second FOV with respect to the first FOV may be 90°, such that the second FOV is orthogonal to the first FOV. In this manner, the second image and the first image may feature adjacent sides of a target object, such as the front/bottom, top/side, top/front, etc., respectively, depending on the orientation of the target object with respect to the bioptic barcode reader 110. To illustrate, assume the target object is a rectangular box of cereal with the front face of the box facing the first FOV. In these embodiments, the first image may feature the front face of the box, and the second image may feature the bottom face of the box.

In other embodiments, the first FOV has a first central axis (e.g., first central axis 110a) and the second FOV has a second central axis (e.g., second central axis 112a) that is substantially orthogonal to the first central axis, such that the relative orientation is substantially similar to 90°. Generally, the relative orientation may be substantially similar to 90° if the angle formed by the intersection of both axes (e.g., θ) is within 20° of a right angle (e.g., 70°≤θ≤110°). As previously mentioned, this orthogonality allows the bioptic barcode reader 100 to potentially image multiple sides of a target object when capturing the first image and the second image, to achieve greater reliability when identifying the target object. However, it will be appreciated that the first central axis and the second central axis may be substantially orthogonal if the angle formed by the intersection of the first central axis and the second central axis is any angle suitable to view multiple sides of a target through the first and second FsoV 110f, 112f.

Moreover, in these embodiments, one of the first central axis or the second central axis may extend in a substantially horizontal direction away from the bioptic barcode reader, and one of the first central axis and the second central axis may extend in a substantially vertical direction away from the bioptic barcode reader. Additionally, in these embodiments, the bioptic barcode reader may have no other fields of view.

However, it will be appreciated that the first central axis and the second central axis may extend in any suitable directions and at any suitable relative orientation to facilitate the bioptic barcode reader 100 potentially imaging multiple sides of a target object when capturing the first image and the second image. For example, the primary imager assembly 103 may be configured to capture a first image through the second FOV 112f, and a second image through a third FOV that is substantially anti-parallel (e.g., facing) to the second FOV 112f. The primary imager assembly 103 may include a series of mirrors, a second imager positioned above the POS station (e.g., POS station 130), and/or other optical arrangement or combination thereof suitable to facilitate the primary imager assembly 103 capturing a second image featuring an overhead view of the target object. In this manner, the bioptic barcode reader 100 may capture a first image of the bottom of the target object and a second image of the top of the target object to determine a target object identification probability for the target object.

The example method 200 continues by analyzing the first image and the second image to identify at least a portion of a barcode (e.g., barcode 140) associated with the target object in either the first image or the second image (block 204). Generally, a customer or store clerk will pass the target object across the FsOV (e.g., 110f, 112f) in a manner that places the barcode (e.g., barcode 140) of the target object within view of at least one of the two FsOV. Namely, the customer or store clerk typically passes the target object across the FsOV with the barcode facing either the first FOV 110f or the second FOV 112f. Accordingly, once the bioptic barcode reader 100 captures the first image and the second image, the reader 100 may analyze both images, using object detection, edge detection, image classification, segmentation, and/or any other suitable machine vision techniques or combinations thereof to identify at least a portion of a barcode within one or both of the first image and the second image. The bioptic barcode reader 100 may then attempt to decode the barcode to identify the target object. Block 204 may be performed by, for example, the bioptic barcode reader 100, and more specifically, the processor 302.

For example, assume a customer or store clerk passes a rectangular cereal box through the POS station 130 with the barcode facing the second FOV 112f. As the cereal box passes across the FsOV, the bioptic barcode reader 100 captures a first image of the box from the first FOV 110f and a second image of the box from the second FOV 112f. The bioptic barcode reader 100 then analyzes both images and identifies at least a portion of the barcode within the second image. If the bioptic barcode reader 100 is able to decode the entire barcode, the reader 100 may retrieve from memory (e.g., memory 304) or access from an external source (e.g., remote server 320) a predicted product associated with the barcode for use in identifying the target object. If the bioptic barcode reader 100 is unable to decode the entire barcode (e.g., due to barcode obscuration in the second image), the reader 100 may store the decoded partial barcode for later use in identifying the target object, as described herein.

In embodiments, the at least the portion of the barcode has a barcode orientation within either the first image or the second image. Generally speaking, barcodes are encoded with identification and other data that can be decoded once the barcode is properly oriented. More specifically, conventional barcodes have special line thicknesses at the sides of the barcode that enable a decoding device to understand where the barcode begins and ends. Moreover, barcode placement on products/packages is not standardized, but manufacturers of a particular product generally place the barcodes on the particular product in a consistent location(s). As a result, barcode placement and orientation on a product/package in an image may provide insight concerning what product/package is represented in the image. Accordingly, the bioptic barcode reader 100 may analyze the first image, the second image, or both images (if they both contain at least a portion of a barcode) to determine the orientation and/or location of the barcode with respect to the target object. For example, the bioptic barcode reader 100 may analyze the first image of a target object and identify at least a portion of a barcode associated with the target object. The bioptic barcode reader 100 may then analyze the at least the portion of the barcode to determine that it is inverted in the upper left-hand corner of the target object in the first image. The bioptic barcode reader 100 may then determine that the target object passed across the first FOV 110f inverted (e.g., upside down) and that the barcode for the target object is located in the lower right-hand corner of one face of the target object.

The example method 200 continues by analyzing the first and the second images to identify one or more features associated with the target object in each of the first image and the second image (block 206). Typically, products located in a store/warehouse contain identifiable logos, graphics, colors, patterns, alphanumeric symbols, package shapes (e.g., rectangular, square, circular, oblong, etc.), and/or other product characteristics. If enough of these product characteristics are known, the product itself may be identified without identifying the name/brand of the product on the package. Accordingly, the bioptic barcode reader 100 may analyze both images, using object detection, edge detection, image classification, segmentation, and/or any other suitable machine vision techniques or combinations thereof to identify one or more features associated with the target object in each of the first image and the second image. In embodiments, the one or more features includes at least one of (i) a graphic on the target object, (ii) an alphanumeric character on the target object, (iii) an edge of the target object, or (iv) a color of the target object. Block 206 may be performed by, for example, the bioptic barcode reader 100, and more specifically, the processor 302.

For example, assume a customer or store clerk passes a rectangular cereal box through the POS station 130. As the cereal box passes across the FsOV, the bioptic barcode reader 100 captures a first image of the box from the first FOV 110$f$ and a second image of the box from the second FOV 112$f$. The bioptic barcode reader 100 then analyzes both images to identify one or more features within both the first image and the second image. The bioptic barcode reader 100 may, for example, analyze the first image and identify a first color, a first graphic, a first logo, and a first target object shape. The bioptic barcode reader 100 may also, for example, analyze the second image and identify the first color, the first logo, and the first target object shape. The bioptic barcode reader 100 may utilize the one or more features from one or both of the first image and the second image to identify the target object. For example, the bioptic barcode reader 100 may determine that the target object is strongly associated with the first color, the first logo, and the first target object shape, and less strongly associated with the first graphic because it only appears in the first image. It will be appreciated that the bioptic barcode reader 100 may analyze one or both of the first image and the second image to determine one or more features associated with the target object, and that the bioptic barcode reader 100 may utilize one or more features from either or both of the first image and the second image when identifying the target object, as described herein.

The example method 200 continues by determining, with a trained object recognition model (e.g., object recognition model 310), a target object identification probability for the target object (block 208). Generally speaking, the trained object recognition model determines, based on the image data (e.g., the first image and the second image), that the imaged target object is possibly one of multiple target objects, each with an associated probability. More specifically, the trained object recognition model may determine a target object identification probability for the target object based on (i) a set of barcode data extracted from the at least the portion of the barcode and (ii) the one or more features. The target object identification probability may associate the target object with a predicted product. The trained object recognition model may determine a single predicted product, or in embodiments, the trained object recognition model may determine a list of predicted products with associated probabilities. The trained object recognition model (e.g., trained object recognition model 310) may be stored in, and accessible via, non-volatile memory 304 of example processing platform 300. Block 208 may be performed by, for example, the trained object recognition model 310.

In embodiments, the trained object recognition model comprises a convolutional neural network. In such embodiments, the convolutional neural network is pretrained with a first set of image data representative of the target object. The convolutional neural network may also be trained with a second set of image data representative of a barcode and/or other alpha-numeric data corresponding to the target object and/or its barcode. Generally speaking, the convolutional neural network or otherwise trained object recognition model (e.g., trained object recognition model 310), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as image data and identifying barcode data or alpha-numeric data corresponding an target object or product) in order to facilitate making predictions for subsequent data (determine a product identification probability for the target object or product).

Machine learning model(s), such as the convolutional neural network or otherwise trained object recognition model (e.g., trained object recognition model 310), may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques. Further, in embodiments, the convolutional neural network or otherwise trained object recognition model (e.g., trained object recognition model 310) may be trained via open source machine learning or CNN code libraries or packages, including, for example, TENSORFLOW, PYTORCH, or the like.

In embodiments, the trained object recognition model may generate a first set of target object identification probabilities based on the first image. The first set of target object identification probabilities may include a first probability associating the target object with a predicted product. The trained object recognition model may then generate a second set of target object identification probabilities based on the second image. The second set of target object identification probabilities may include a second probability associating the target object with the predicted product. For example, the trained object recognition model may analyze a first image of a first cereal box to generate a first set of target object identification probabilities identifying a 98% confidence match to the first cereal box, a 83% confidence match to a second cereal box, a 57% match to a first box of tissues, and a 12% match to a first bottle of medication. Accordingly, the trained object recognition model may analyze a second image of the first cereal box to generate a second set of target object identification probabilities identifying a 93% confidence match to the first cereal box, a 87% confidence match to the second cereal box, a 25% confidence match to the first box of tissues, and a 1% confidence match to the first bottle of medication.

In embodiments, the trained object recognition model may generate a set of target object identification probabilities based on the first image and the second image. The set of target object identification probabilities may include a first probability associating the target object with the predicted product. Accordingly, in these embodiments, the trained object recognition model may analyze the first image and the second image simultaneously or successively to identify the at least the portion of the barcode and the one or more features associated with the target object to determine the set of target object identification probabilities. In reference to the above example, the trained object recognition model may analyze both the first image and the second image of the first cereal box to generate a set of target object identification probabilities identifying a 96% confidence match to the first cereal box, a 82% confidence match to the second cereal box, a 33% confidence match to the first box of tissues, and a 8% confidence match to the first bottle of medication.

In embodiments, the trained object recognition model may determine a target object identification probability for the target object based on (i) a set of barcode data extracted from the at least the portion of the barcode, (ii) a barcode orientation, (iii) the one or more features, and (iv) a relative orientation of the second FOV (e.g., second FOV 112*f*) with respect to the first FOV (e.g., first FOV 110*f*). The target object identification probability may associate the target object with a predicted product. In accordance with the above example, the trained object recognition model may identify at least a portion of the barcode associated with the first cereal box, an orientation of the at least the portion of the barcode, one or more features of the first cereal box, and determine/retrieve from memory the relative orientation of the second FOV with respect to the first FOV. Based on this information, the target object recognition model may generate a set of target object identification probabilities identifying a 95% confidence match to the first cereal box, a 86% confidence match to the second cereal box, a 38% confidence match to the first box of tissues, and a 10% confidence match to the first bottle of medication.

The example method 200 continues by comparing the target object identification probability to an identification probability threshold to determine whether the predicted product(s) identifies the target object (block 210). The identification probability threshold may be any suitable value, and may be pre-established in memory (e.g., memory 304), or may be selected by an operator, store manager, or other suitable user. For example, the identification probability threshold may be 90%, and as a result, any target object identification probabilities that do not meet or exceed 90% may not be selected to identify the target object. Block 210 may be performed by, for example, the trained object recognition model 310.

In embodiments, the trained object recognition model may determine whether the predicted product identifies the target object by comparing a first probability or first list of probabilities to an identification probability threshold. The trained object recognition model may generate the first probability or first list of probabilities based on the first image of the target object.

In embodiments, the trained object recognition model may determine whether the predicted product identifies the target object by comparing a first probability or first list of probabilities and a second probability or second list of probabilities to an identification probability threshold. The trained object recognition model may generate the first probability or first list of probabilities based on the first image of the target object, and may generate the second probability or second list of probabilities based on the second image of the target object. Accordingly, the trained object recognition model may determine whether the predicted product identifies the target object by determining whether one or both of the first probability or first list of probabilities and the second probability or second list of probabilities meets or exceeds the identification probability threshold, by determining whether the average of the first probability or first list of probabilities and the second probability or second list of probabilities meets or exceeds the identification probability threshold, and/or by using any other suitable analysis or combination thereof.

Generally, the target object identification probabilities that exceed the identification probability threshold will identify the same predicted product. However, in the case of ticket switching, for example, the first target object identification probability may identify a different product than the second target object identification probability. To illustrate, if a customer or store clerk passes a box of cereal across the scanning platform with a magazine covering the front face of the box, the trained object recognition model may identify the magazine via the first image and the box of cereal via the second image. Accordingly, in embodiments, the trained object recognition model may determine a first target object identification for the target object based on the first image and a second target object identification for the target object based on the second image. In these embodiments, each of the first target object identification and the second target object identification may be based on at least one of (i) the set of barcode data extracted from the at least the portion of the barcode, (ii) the one or more features, and (iii) the target object identification probability. In the box of cereal example, the trained object recognition model may identify the magazine (e.g., the first target object identification) based on the graphics located on the front cover (e.g., the magazine title, logos, etc.) and a barcode located on the front cover. The trained object recognition model may identify the box of cereal (e.g., the second target object identification) based on a barcode and a logo located on the bottom surface of the box.

In these embodiments, once the trained object recognition model determines that the first target object identification differs from the second target object identification, the trained object recognition model may perform at least one of (i) generate a first alert for display to a user, (ii) generate a second alert for transmission to a remote monitoring system, (iii) transmit a notification including the first target object identification and the second target object identification to a point-of-sale station, and (iv) do not transmit the first target object identification and the second target object identification to the memory for training the trained object recognition model.

In embodiments, and responsive to determining that the target object identification probability exceeds the identification probability threshold, the trained object recognition model may compare the at least the portion of the barcode to a predicted barcode associated with the predicted product. For example, assume that the trained object recognition model determines that a first predicted product has a target object identification probability that exceeds the identification probability threshold. Further assume that the bioptic barcode reader 100 determined a portion of a barcode associated with the target object, but not enough of the barcode to create an identical match with any predicted product.

In this scenario, the trained object recognition model may compare the decoded portion of the barcode associated with the target object to the decoded barcode of the first predicted product. If the trained object recognition model determines a match between the decoded portion of the barcode associated with the target object and the decoded barcode of the first predicted product, the trained object recognition model may confirm that the first predicted product identifies the target object. In this manner, the trained object recognition model may utilize the portion of the barcode associated with the target object to check whether the predicted product accurately identifies the target object.

Moreover, the trained object recognition model may use the association of the decoded portion of the barcode associated with the target object and the decoded barcode of the first predicted product to improve decoding of incomplete barcodes. For example, once the trained object recognition model identifies the target object with the first predicted product, the trained object recognition model may then associate the decoded portion of the barcode with the first predicted product. Consequently, in these embodiments, and responsive to determining a match between the at least the portion of the barcode and the predicted barcode, the trained object recognition model may at least one of (i) identify the target object as the predicted product and (ii) train the trained object recognition model using the at least the portion of the barcode and the predicted product.

Additionally or alternatively, the trained object recognition model may compare the decoded portion of the barcode associated with the target object to the decoded barcodes of each predicted product with a corresponding target object identification probability meeting or exceeding the identification probability threshold. For example, assume a first predicted product, a second predicted product, and a third predicted product each have a corresponding target object identification probability meeting or exceeding the identification probability threshold. Accordingly, the trained object recognition model may compare the decoded portion of the barcode associated with the target object to a decoded barcode associated with the first predicted product, the second predicted product, and the third predicted product. If the decoded portion of the barcode associated with the target object matches to a portion of the decoded barcode associated with the second predicted product, the trained object recognition model may confirm that the second predicted product identifies the target object.

As described, the example method 200 may reduce the incidence/success rate of theft events. Using a first image from a first FOV and a second image from a second FOV enables the bioptic barcode reader 100 to accurately and reliably determine the identity of a target object. For example, assume a customer or store clerk attempts to ticket switch by placing a cheaper item in front of a more expensive item as the items pass across the scanning area. The bioptic barcode reader 100 may capture the first image from the first FOV and the second image from the second FOV, analyze them using the trained object recognition model (e.g., CNN), and identify the attempted theft because the bioptic barcode reader 100 determines that two items are present in the second image (e.g., two different products are visible in the second FOV 112f). Accordingly, a bioptic barcode reader utilizing the example method 200 described herein may effectively reduce the success rate, and as a result, the incidence rate of theft events at POS stations due to direct impact multiple FsOV may have in identifying ticket switching, scan avoidance, sweethearting, and/or other theft events.

Figure 3:
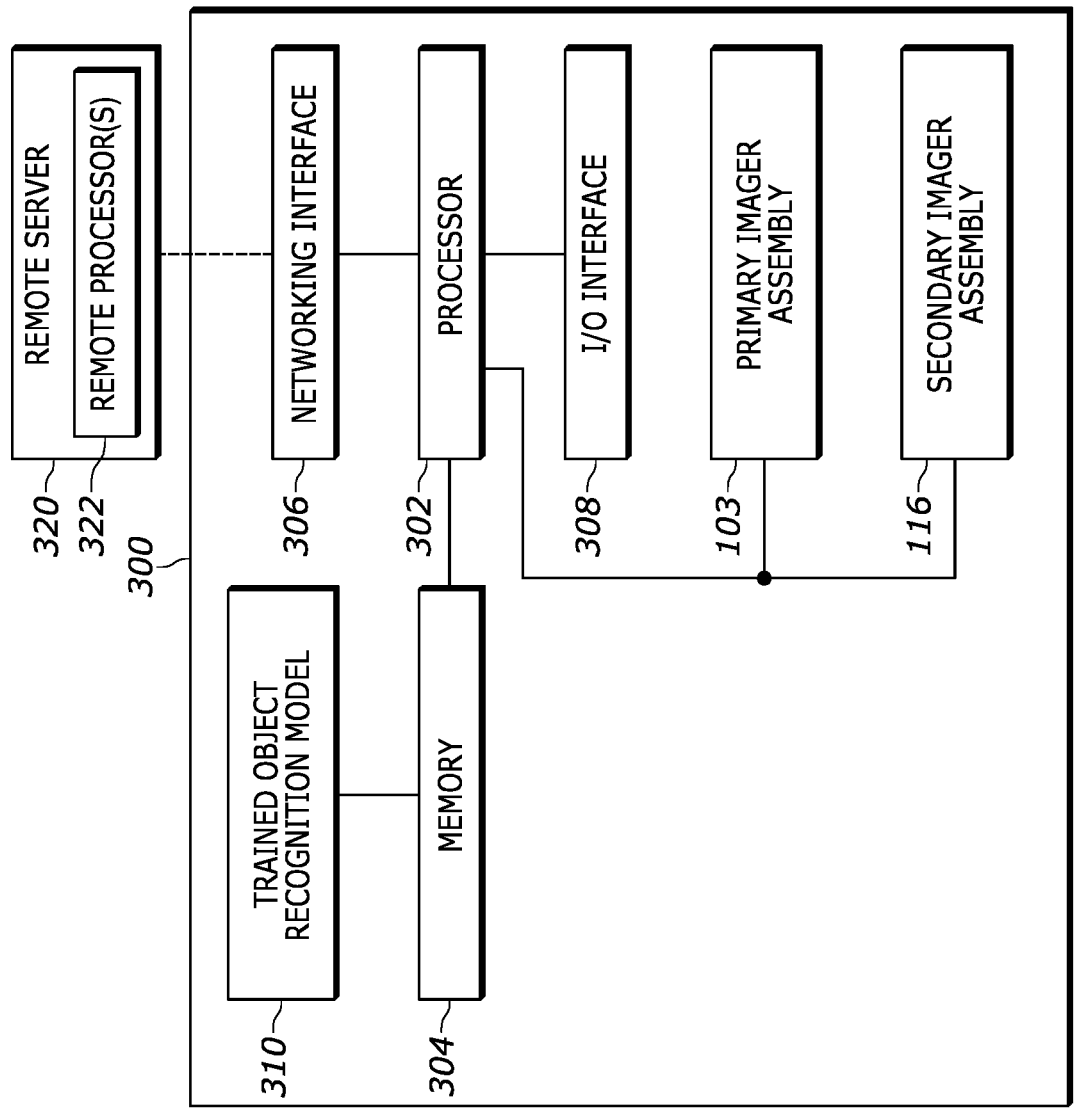
FIG. 3 is a block diagram of an example logic circuit for implementing example methods and/or operations described herein.

FIG. 3 is a block diagram representative of an example logic circuit capable of implementing, for example, one or more components of the example bioptic barcode reader 100, or otherwise system, of FIGS. 1A, 1B, and/or 1C, or, more generally, the example processor (e.g., processor 302) of FIG. 3. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The example processor 302 may also interact with the memory 304 to obtain, or store, a trained object recognition model as described herein. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s). For example, in some embodiments, networking interface 306 may transmit data or information (e.g., imaging data, trained object recognition models, etc., described herein) between remote processor(s) 322 and/or remote server 320, and processing platform 300.

The example, processing platform 300 of FIG. 3 also includes input/output (I/O) interfaces 308 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader having a target object imaging region, the barcode reader comprising:
   at least one imager having a first field of view (FOV) and a second FOV, wherein the at least one imager is configured to capture (i) a first image of a target object placed in a target imaging region within the first FOV and (ii) a second image of the target object within the second FOV;
   one or more processors configured to receive the first image and the second image captured by the at least one imager; and
   a memory communicatively coupled to the one or more processors, the memory storing instructions that, when executed by the one or more processors, cause the one or more processors to:
      analyze the first image and the second image to identify at least a portion of a barcode associated with the target object in either the first image or the second image;
      analyze the first image and the second image to identify one or more features associated with the target object in each of the first image and the second image;
      determine a first target object identification for the target object based on the first image and a second target object identification for the target object based on the second image, wherein each of the first target object identification and the second target object identification is based on at least one of (i) the set of barcode data extracted from the at least the portion of the barcode, or (ii) the one or more features; and
      responsive to determining that the first target object identification differs from the second target object identification, at least one of (i) generate a first alert for display to a user, (ii) generate a second alert for transmission to a remote monitoring system, or (iii) transmit a notification including the first target object identification and the second target object identification to a point-of-sale station.

2. The barcode reader of claim 1, wherein the instructions, when executed by the one or more processors, further cause the one or more processors to:
   generate a first set of target object identification probabilities based on the first image, wherein the first set of target object identification probabilities includes a first probability associating the target object with a predicted product;
   generate a second set of target object identification probabilities based on the second image, wherein the second set of target object identification probabilities includes a second probability associating the target object with the predicted product; and
   determine whether the predicted product identifies the target object by comparing the first probability and the second probability to the identification probability threshold.

3. The barcode reader of claim 1, wherein the second FOV has a relative orientation with respect to the first FOV, the at least the portion of the barcode has a barcode orientation within either the first image or the second image, and wherein the instructions, when executed by the one or more processors, further cause the one or more processors to:
   determine a target object identification probability for the target object based on (i) a set of barcode data extracted from the at least the portion of the barcode, (ii) the barcode orientation, (iii) the one or more features, or (iv) the relative orientation, wherein the target object identification probability associates the target object with a predicted product.

4. The reader of claim 3, wherein the first FOV has a first central axis and the second FOV has a second central axis that is within 20 degrees of being substantially orthogonal to the first central axis.

5. The barcode reader of claim 4, wherein one of the first central axis or the second central axis extends in a substantially horizontal direction away from the barcode reader, and wherein one of the first central axis and the second central axis extends in a substantially vertical direction away from the barcode reader.

6. The barcode reader of claim 4, wherein the barcode reader has no other fields of view.

7. The barcode reader of claim 1, wherein the at least one imager comprises one imager, and the barcode reader has no other imagers configured to capture the first image and the second image.

8. The barcode reader of claim 1, wherein the one or more features includes at least one of (i) a graphic on the target object, (ii) an alphanumeric character on the target object, (iii) an edge of the target object, or (iv) a color of the target object.

9. A target object recognition method for a barcode reader having a target object imaging region, the method comprising:
   capturing, with at least one imager of the barcode reader, a first image of a target object placed in a target imaging region from a first FOV and a second image of the target object from a second FOV;
   analyzing the first image and the second image to identify at least a portion of a barcode associated with the target object in either the first image or the second image;
   analyzing the first image and the second image to identify one or more features associated with the target object in each of the first image and the second image;
   determine, with the trained object recognition model, a first target object identification for the target object based on the first image and a second target object identification for the target object based on the second image, wherein each of the first target object identification and the second target object identification is based on at least one of (i) the set of barcode data extracted from the at least the portion of the barcode, or (ii) the one or more features; and
   responsive to determining that the first target object identification differs from the second target object identification, at least one of (i) generate a first alert for display to a user, (ii) generate a second alert for transmission to a remote monitoring system, or (iii) transmit a notification including the first target object identification and the second target object identification to a point-of-sale station.

10. The target object recognition method of claim 9, further comprising:
    responsive to determining that the target object identification probability exceeds the identification probability threshold, comparing the at least the portion of the barcode to a predicted barcode associated with a predicted product; and
    responsive to determining a match between the at least the portion of the barcode and the predicted barcode, at least one of (i) identifying the target object as the predicted product and (ii) training the trained object recognition model using the at least the portion of the barcode and the predicted product.

11. The target object recognition method of claim 9, wherein the second FOV has a relative orientation with respect to the first FOV, the at least the portion of the barcode has a barcode orientation within either the first image or the second image, and the method further comprising:
  determining a target object identification probability for the target object based on (i) a set of barcode data extracted from the at least the portion of the barcode, (ii) the barcode orientation, (iii) the one or more features, and (iv) the relative orientation, wherein the target object identification probability associates the target object with a predicted product.

12. The target object recognition method of claim 9, wherein the first FOV has a first central axis and the second FOV has a second central axis that is within 20 degrees of being substantially orthogonal to the first central axis.

13. The target object recognition method of claim 12, wherein one of the first central axis or the second central axis extends in a substantially horizontal direction away from the barcode reader, and wherein one of the first central axis and the second central axis extends in a substantially vertical direction away from the barcode reader.

14. The target object recognition method of claim 9, wherein the barcode reader has no other fields of view.

15. The target object recognition method of claim 9, wherein the at least one imager comprises one imager, and the barcode reader has no other imagers configured to capture the first image and the second image.

16. The target object recognition method of claim 9, wherein the one or more features includes at least one of (i) a graphic on the target object, (ii) an alphanumeric character on the target object, (iii) an edge of the target object, or (iv) a color of the target object.

* * * * *